Patented June 9, 1925.

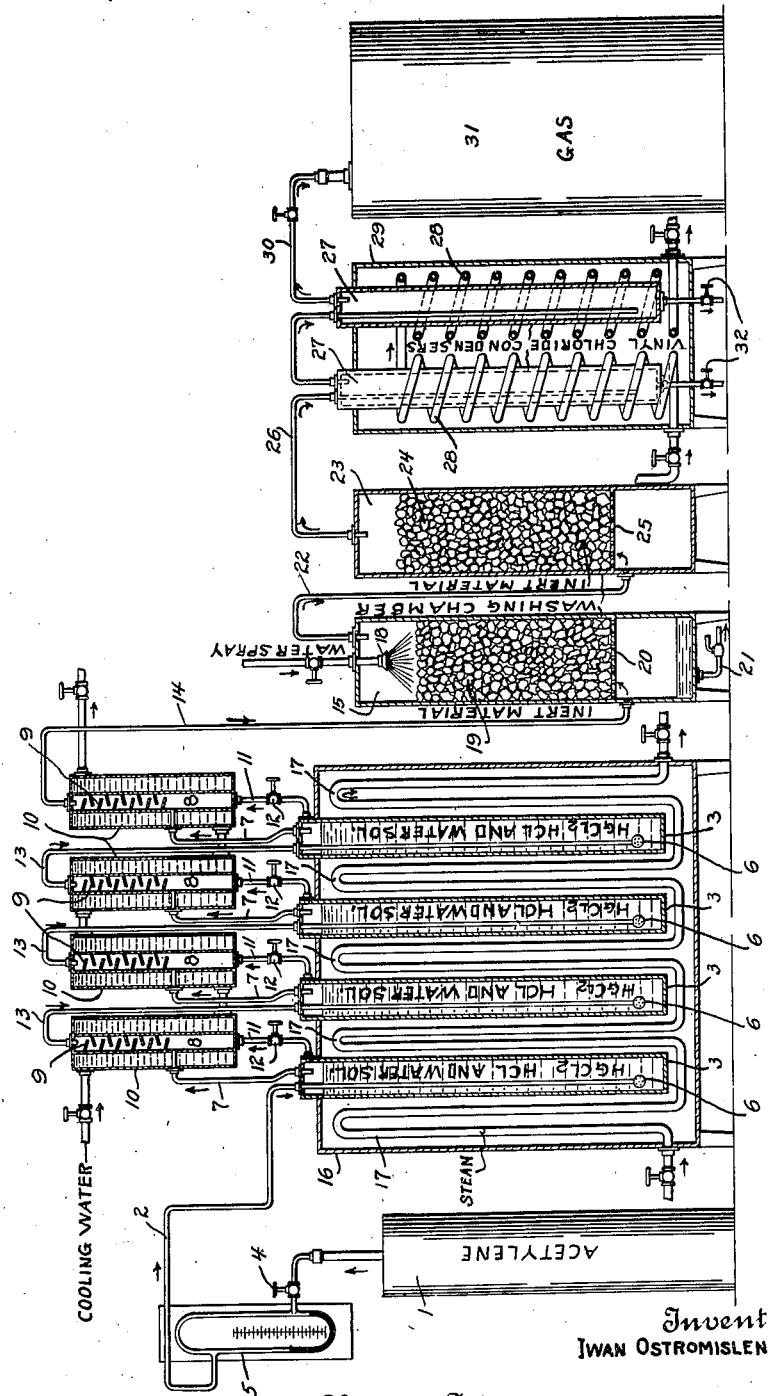

1,541,174

UNITED STATES PATENT OFFICE.

IWAN OSTROMISLENSKY, OF LOCUST POINT, NEW JERSEY, ASSIGNOR TO THE NAUGATUCK CHEMICAL COMPANY, OF NAUGATUCK, CONNECTICUT, A CORPORATION OF CONNECTICUT.

PROCESS FOR OBTAINING VINYL CHLORIDE FROM ACETYLENE.

Application filed September 14, 1922. Serial No. 588,112.

*To all whom it may concern:*

Be it known that I, IWAN OSTROMISLENSKY, a citizen of Russia, residing at Locust Point, county of Monmouth, State of New Jersey, have invented certain new and useful Improvements in Processes for Obtaining Vinyl Chloride from Acetylene, of which the following is a full, clear, and exact description.

This invention relates to processes for obtaining vinyl chloride from acetylene, being more particularly directed to processes carried out for such purpose by the direct action of hydrochloric acid on acetylene.

It has been proposed to convert acetylene into vinyl chloride by the direct action of hydrochloric acid in the presence of mercuric chloride as a catalyst. Numerous attempts, however, to carry out this reaction, varying the proportions of acetylene and hydrochloric acid and employing a quantity of mercuric chloride, such as might be employed catalytically, have resulted in the production of negligible quantities of vinyl chloride, even where the reaction was effected at elevated temperatures. For example, when pure acetylene has been introduced at the rate of approximately 60 c. c. per minute into a solution of mercuric chloride containing 1.4 grams of mercuric chloride and hydrochloric acid containing 390 grams of dry hydrochloric acid gas the total volume of the solution being 1400 c. c., at a temperature of 90° C. only 5 grams of vinyl chloride were obtained in three and one-half hours. On account of this insignificant yield the process proposed is not adapted to commercial use.

The principal object of the present invention, accordingly, is to improve the process of the direct reaction of the acetylene and hydrochloric acid in the presence of a mercuric salt to produce a far larger proportionate yield or substantially pure vinyl chloride while simplifying the means for bringing the reacting materials into contact, and without increasing the cost of the process.

It has been found in accordance with the present invention that although mercuric chloride has been referred to as a catalyst in the process indicated above, in reality it exhibits characteristics which are not ordinarily associated with a catalyst. Ordinarily where a reaction takes place in the presence of a catalyst variation of the amount of catalyst present does not affect the yield obtained by the process. The yield remains substantially the same within wide limits of the amount of catalyst employed. According to the present invention, however, it has been found that mercuric chloride differs in its action from the action of an ordinary catalyst, and while it produces a negligible yield of vinyl chloride when used in small quantity, as recited above, the yield constantly increases with the amount of mercuric chloride present up to a certain quantity, given below, with a given rate of delivery of acetylene and a given quantity of hydrochloric acid present. In addition, it has been found in accordance with the present invention that although shaking or stirring have been proposed to cause a better contact between acetylene and hydrochloric acid gas such mechanical devices may be dispensed with if desired and there may be substituted therefor a simple means for insuring contact throughout a relatively long interval of time of the reacting components together with removal, if desired, of the resultant vinyl chloride from the reacting mixture.

The invention thus consists broadly in passing acetylene through a mixture of heated hydrochloric acid, water, and a compound of mercury in a quantity more than 0.1 mol. per litre of water, and recovering vinyl chloride produced thereby. It also includes bubbling acetylene through a column of hydrochloric acid, water, and a compound of mercury and recovering the vinyl chloride thereby produced.

The accompanying drawing shows an elevation, partially in section, of apparatus, part of which is indicated diagrammatically, which may be conveniently employed for carrying out the process constituting the invention. In this drawing 1 indicates a tank of purified acetylene. Purification consists in the removal of water-vapor, phosphine hydrogen sulphide and acetone which may be present where acetylene has been mixed with acetone for safety. Purification may be accomplished in any desired manner. A pipe 2 leads from the acetylene tank into a reaction tube 3 adapted to contain a column of water, hydrochloric acid and mercuric chloride or other mercuric compound. Any desired number of reaction tubes 3 may be employed. Four are here shown. The flow of acetylene through pipe 2 into the reaction tubes 3 is controlled by a valve 4 and metered by a flow meter 5. The pipe 2 terminates adjacent the bottom of the tube 3 in one of a series of bulbs 6 placed near the bottom of each reaction tube 3 and adapted to deliver the acetylene into the bottom of a column of liquid so that a large number of bubbles to a given quantity of the gas will pass upward through the liquid. This large number of bubbles provides extensive surface contact of the gas with the liquid for the period of its travel therethrough and thus renders stirring of the liquid and acetylene unnecessary.

At the top of the reaction tube 3 is a pipe 7 communicating with one of a series of condensers. Each of the condensers is identical, and a description of one will serve for all. The pipe 7 communicates with the interior of an inner tube 8 provided with baffles 9 and a jacket 10 for the introduction of water or other cooling agent. The inner tube 8 at its lower end is connected by a pipe 11 to deliver condensate into the upper portion of the tube 3, the flow of the condensate being controlled by a valve 12.

Except for the last condenser a pipe 13 for each condenser leads from the top of the inner tube 8 of the condenser to a point adjacent the bottom of the reaction tube 3 next in the series, terminating in the perforated bulb 6. The inner tube 8 of the last member of the series is joined at its top by a pipe 14 which enters a washing chamber 15 in the bottom thereof.

The reaction tubes 3 are housed in a casing 16 through which passes a steam pipe having coils 17 providing heat for the full length of each reaction tube, and arranged so that there is a coil on each side of each reaction tube.

The gases passing through the last condenser enter the washing chamber which contains a water spray 18 near its top and is filled with inert material 19 to break up the gas flow and aid washing. This material is supported on a perforated shelf 20 near the bottom of the chamber. From the bottom of the chamber a pipe 21 conducts away the wash waters. The gases passing from the chamber by means of the pipe 22 enter a drying chamber 23 in which calcium chloride or other dehydrating material 24 is supported on a shelf 25 lying near the bottom of the chamber. The dry gas is then passed by the pipe 26 through vinyl chloride condensers 27. Each condenser consists of a tube surrounded by a coil 28 through which ammonia gas or other cooling medium passes having a temperature lower than the boiling point of the vinyl chloride. The condensers are surrounded by a housing 29. Any gas passing off through the vinyl chloride condenser flows through a pipe 30 into a tank 31. The condensers 27 are provided with outlying valves 32 to withdraw the vinyl chloride.

It is to be understood that various modifications may be made in the apparatus described. The reaction tubes may be varied in shape. It is important, however, that they support a column of liquid sufficient to provide ample contact of acetylene with the other reacting materials. It is not necessary that the columns be vertical, as shown; they may be inclined, as desired. Heating may be effected by other means than the steam coil 17. The means for distributing the gas as bubbles may assume other shapes than that shown.

In carrying out the process in its preferred form, employing, for example, the appartus described, 50 litres per minute of acetylene are passed from the tank 1 into the first of the series of reaction tubes 3. The four reaction tubes contain preferably approximately 1500 litres of solution containing about 40.5 kgs. of mercuric chloride dissolved in a two to one mixture of hydrochloric acid specific gravity 1.2 and water. Reaction takes place with conversion of a part of the acetylene to vinyl chloride in each of the reaction tubes. Each column of liquid is narrow compared with its height, the ratio of width to height being as here shown about 1 to 11, although a greater or less ratio may be employed, as desired, provided that sufficient contact for a satisfactory yield is obtained between the acetylene bubbling from the nozzle 6 and the hydrochloric acid, water, and mercuric chloride. The reaction taking place, is probably, as follows:

(I) $CH:CH + HgCl_2 = CHCl:CH.HgCl$
(II) $CHCl:CH.HgCl + HCl = CHCl:CH_2 + HgCl_2$

The mixture in the reaction tubes is preferably maintained at approximately 90° C. Vinyl chloride produced in the first reaction chamber together with an acetylene, hydrochloric acid gas, and water passing into the tube 7 go to the first condenser 10 and hydrochloric acid and water in large part pass back to the first reaction tube through the pipe 11. The vinyl chloride and the acetylene with any uncondensed portions of hydrochloric acid and water then pass into the second of the series of reaction tubes through the nozzle 6 and a further quantity of vinyl chloride is formed. A similar condensation of any products condensable at the temperature employed in the series of reaction tube condensers occurs in the second condenser of the series. The process is continued in the third and fourth reaction tubes similarly, the vinyl chloride passing finally from the last condenser through the pipe 14 into the washing chamber 15 where hydrochloric acid is removed by washing with water. The gas then passes into calcium chloride for drying and thence into the vinyl chloride condensers 27 which are cooled to a temperature below $-12°$ C., the boiling point of pure vinyl chloride. If an excess of acetylene has been used over that convertible by the reaction tubes, it will pass into the tank 31. The vinyl chloride may be run out through the valves 32 as desired.

The yield obtainable under the conditions outlined is high. 75 to 80% of the acetylene employed is converted without difficulty into pure vinyl chloride. Pure vinyl chloride boils at $-12°$ C. The vinyl chloride prepared as above has a boiling point of $-10$ to $-14°$ C. If polymerized in sunlight it forms cauprene chloride very readily. Some of the product has also polymerized in the dark. This pure material, it will be observed, may be prepared from inexpensive reagents and is itself an inexpensive product. It will be observed that this production of a greater yield is accomplished by simple apparatus. The reacting materials are brought into contact and permitted to react without mechanical agitation or stirring. The elimination of such mechanical action in itself decreases the cost of the process, and in addition, the absence of a stirring means avoids the necessity of the maintenance of gas-tight bearings or joints for such stirring means.

The concentration of hydrochloric acid given above represents approximately 0.285 kg. per litre, but concentrations of 0.143 kg. per litre and 0.428 kg. per litre have been satisfactorily employed. The concentration of mercuric chloride, given above, is it will be noted, approximately .027 kg. per litre. 0.45 kg. per litre has provided the highest yield of vinyl chloride but a concentration of .027 kg. per litre or above provides a satisfactory yield. Contrary to what might be expected from a catalytic reaction, the yield appears to be almost directly proportional to the concentration of mercuric chloride up to a concentration of about .027 kg. per litre. From there on, the yield does not increase in proportion to the concentration. The following table shows the increase indicated:

| Concentration HgCl₂ in gms. per litre | Productivity of the apparatus in gms. vinyl chloride per hour |
|---|---|
| 1 | 1.43 |
| 15 | 4.33 |
| 27 | 7.73 |
| 45 | 9.25 |

The greater the volume of solution used the more rapidly may acetylene be passed through and the greater the productivity of the apparatus per hour. In the preferred example given above it will be noted that a rate of 50 litres per minute of acetylene is used, and with the amount of solution employed such flow has been found to give as high yields of vinyl chloride as though 200 litres per minute were used, the extra 150 litres per minute simply passing to waste. If the amount of solution is increased, however, of course a higher flow of acetylene can be maintained. An elevated temperature, approximately 90° C., appears desirable for the reaction in the reaction tubes. Operation at room temperature has not proved satisfactory.

As many apparently widely different embodiments of this invention may be made, without departing from the spirit thereof, it is to be understood that I do not intend to limit myself to the specific embodiment herein disclosed, except as indicated in the appended claims.

Having thus described my invention, what I claim and desire to protect by Letters Patent is:

1. A process for making vinyl chloride which comprises passing acetylene through a water solution of hydrochloric acid containing more than 0.1 mol. per litre of a mercury compound, and recovering vinyl chloride produced thereby.

2. A process for making vinyl chloride which comprises passing acetylene through a mixture of heated water solution of hydrochloric acid, and mercuric chloride in a quantity more than .027 kg. per litre, and recovering vinyl chloride produced thereby.

3. A process for making vinyl chloride which comprises passing acetylene through a mixture of heated hydrochloric acid and water containing .027 kg. per litre of mercuric chloride, and recovering the vinyl chloride produced thereby.

4. A process for making vinyl chloride which comprises passing approximately 50 litres per minute of acetylene through 1500 litres of a water solution containing .027 kg. per litre of mercuric chloride and 0.285 kg. per litre of hydrochloric acid, the solution being heated to approximately 90° C., and recovering vinyl chloride produced thereby.

5. A process for making vinyl chloride which comprises bubbling acetylene through a column of heated hydrochloric acid, water, and mercuric chloride in a quantity above .027 kg. per litre, and recovering vinyl chloride produced thereby.

6. A process for making vinyl chloride which comprises bubbling acetylene through a solution of 500 to 1500 litres of a heated water solution of hydrochloric acid and mercuric chloride in the proportion of approximately 0.285 kg. hydrochloride acid per litre and mercuric chloride approximately .027 kg. per litre, and recovering vinyl chloride produced thereby.

Signed at New York, New York, this 7 day of August, 1922.

IWAN OSTROMISLENSKY.